(12) United States Patent
Kolesnik et al.

(10) Patent No.: US 11,042,464 B2
(45) Date of Patent: Jun. 22, 2021

(54) LOG RECORD ANALYSIS BASED ON REVERSE ENGINEERING OF LOG RECORD FORMATS

(71) Applicant: Red Hat Israel, Ltd., Raanana (IL)

(72) Inventors: Michael Kolesnik, Raanana (IL); Mordechay Asayag, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 73 days.

(21) Appl. No.: 16/036,333

(22) Filed: Jul. 16, 2018

(65) Prior Publication Data

US 2020/0019484 A1 Jan. 16, 2020

(51) Int. Cl.
*G06F 11/00* (2006.01)
*G06F 11/34* (2006.01)
*G06F 40/186* (2020.01)
*G06F 40/211* (2020.01)

(52) U.S. Cl.
CPC ........ *G06F 11/3476* (2013.01); *G06F 40/186* (2020.01); *G06F 40/211* (2020.01)

(58) Field of Classification Search
CPC ............. G06F 11/3466; G06F 11/3471; G06F 11/3476; G06F 11/348; G06F 11/3485; G06F 11/349; G06F 11/3495; G06F 11/3636; G06F 11/364
USPC ...................................................... 714/1–57
See application file for complete search history.

(56) References Cited

U.S. PATENT DOCUMENTS

| | | | |
|---|---|---|---|
| 7,873,608 B2 | 1/2011 | Desai et al. | |
| 8,032,489 B2 | 10/2011 | Villella et al. | |
| 9,483,583 B2 | 11/2016 | Braun et al. | |
| 9,953,185 B2 | 4/2018 | Bendersky et al. | |
| 10,114,148 B2 | 10/2018 | Ning et al. | |
| 10,133,741 B2 | 11/2018 | Hahn et al. | |
| 10,462,024 B1* | 10/2019 | Kavanagh | G06Q 40/04 |
| 2002/0161673 A1 | 10/2002 | Lee et al. | |
| 2008/0104094 A1 | 5/2008 | Cowham et al. | |

(Continued)

FOREIGN PATENT DOCUMENTS

CN 105049287 A 11/2015

OTHER PUBLICATIONS

Debnath, Biplob, et al., "Fast Log Analysis Made Easy by Automatically Parsing Heterogeneous Logs," LISA17, Oct. 29-Nov. 3, 2017, San Francisco, California, 45 pages.

(Continued)

*Primary Examiner* — Sarai E Butler
(74) *Attorney, Agent, or Firm* — Withrow & Terranova, PLLC

(57) ABSTRACT

Log record analysis based on reverse engineering of log record formats is disclosed. A computing device receives log record template data associated with a log record template comprising a plurality of field identifiers for a log record. The log record template data is analyzed to identify the plurality of field identifiers. Based on the log record template data and the plurality of field identifiers, a log record analysis function is automatically generated that is configured to receive a log record that was generated based on the log record template, extract a plurality of log data items from the log record, each log data item corresponding to one of the plurality of field identifiers, and output information that identifies the plurality of field identifiers and the plurality of log data items.

18 Claims, 9 Drawing Sheets

(56) References Cited

U.S. PATENT DOCUMENTS

| | | | | |
|---|---|---|---|---|
| 2009/0063395 | A1* | 3/2009 | Klump | G06F 11/0709 |
| 2013/0132347 | A1* | 5/2013 | Chen | G06F 11/1456 |
| | | | | 707/648 |
| 2015/0135320 | A1* | 5/2015 | Coskun | H04L 63/1425 |
| | | | | 726/24 |
| 2016/0246830 | A1* | 8/2016 | Chiu | G06F 16/1734 |
| 2018/0089331 | A1* | 3/2018 | Long | G06F 16/9024 |
| 2018/0150554 | A1* | 5/2018 | Le | G06F 16/215 |
| 2018/0307576 | A1 | 10/2018 | Debnath et al. | |
| 2020/0160230 | A1 | 5/2020 | Wang et al. | |

OTHER PUBLICATIONS

Nguyen, Thu, "How to Graph Logs & Visualize Data for Proper Log Analysis," logdna.com/blog/how-to-visualize-your-log-data/, Sep. 7, 2018, LogDNA, 10 pages.

Author Unknown, "Log Parsing," Log Parsing Features, xpolog.com/all-features/log-parsing#Regular_Expression, Accessed on Apr. 30, 2018, XpoLog LTD., 6 pages.

Author Unknown, "Parsing Logs," Scalyr, www.scalyr.com/help/parsing-logs, Accessed on Apr. 30, 2018, 21 pages.

Author Unknown, "Regular expression for Apache log parsing," Statistical Modeling, statmodeling.com/regular-expression-for-apache-log-parsing.html, Oct. 22, 2013, 6 pages.

Author Unknown, "Webpack Extract Translation Keys Plugin (Regex version)," Version 1.0.1, www.npmjs.com/package/webpack-extract-translation-keys-regex-plugin, Accessed on Apr. 30, 2018, 10 pages.

Non-Final Office Action for U.S. Appl. No. 16/529,134, dated Feb. 17, 2021, 8 pages.

\* cited by examiner

LOG RECORD ANALYSIS BASED ON REVERSE ENGINEERING OF LOG RECORD FORMATS

TECHNICAL FIELD

The examples relate generally to log files and log records, and in particular to log record analysis based on reverse engineering of log record formats.

BACKGROUND

Log records generated by an information technology system may contain a wealth of information regarding practically all aspects of the information technology system. Consequently, it is common to analyze log records for any of a number of reasons, such as, by way of non-limiting example, to ascertain how a problem with the information technology system occurred.

SUMMARY

The examples analyze data to determine a layout of a log record. The examples generate executable instructions that can then be invoked to process log records generated based on the log record layout and to extract log data items from such log records. Because the examples utilize a particular layout of a log record, sometimes referred to herein as a log record template, the examples eliminate a need to write new analysis log record instructions each time the format of a log record is altered. Moreover, the examples facilitate the analysis of log records in different written languages without a need to generate separate log record analysis instructions for each different written language.

In one example a method is provided. The method includes receiving, by a computing device comprising a processor device, log record template data associated with a log record template comprising a plurality of field identifiers for a log record. The method further includes analyzing the log record template data to identify the plurality of field identifiers. The method further includes, based on the log record template data and the plurality of field identifiers, automatically generating a log record analysis function that is configured to receive a log record that was generated based on the log record template, extract a plurality of log data items from the log record, each log data item corresponding to one of the plurality of field identifiers, and output information that identifies the plurality of field identifiers and the plurality of log data items.

In another example a computing device is provided. The computing device includes a memory and a processor device coupled to the memory. The processor device is to receive log record template data associated with a log record template comprising a plurality of field identifiers for a log record. The processor device is further to analyze the log record template data to identify the plurality of field identifiers. The processor device is further to, based on the log record template data and the plurality of field identifiers, automatically generate a log record analysis function that is configured to receive a log record that was generated based on the log record template, extract a plurality of log data items from the log record, each log data item corresponding to one of the plurality of field identifiers, and output information that identifies the plurality of field identifiers and the plurality of log data items.

In another example a computer program product is provided. The computer program product is stored on a non-transitory computer-readable storage medium and includes instructions to cause a processor device to receive log record template data associated with a log record template comprising a plurality of field identifiers for a log record. The instructions further cause the processor device to analyze the log record template data to identify the plurality of field identifiers. The instructions further cause the processor device to, based on the log record template data and the plurality of field identifiers, automatically generate a log record analysis function that is configured to receive a log record that was generated based on the log record template, extract a plurality of log data items from the log record, each log data item corresponding to one of the plurality of field identifiers, and output information that identifies the plurality of field identifiers and the plurality of log data items.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Log records are often analyzed by ascertaining a log record layout of a log record and then generating regular expressions (regex) that parse log records and extract desired fields from the log record. Unfortunately, the regular expressions must be generated for each different log record layout, for each different spoken language in which the log records may have been generated, and each time the log record layout changes. Moreover, generating regular expressions requires a certain amount of specialized knowledge that may not be available upon demand.

The examples automatically, and in some examples without human involvement, generate parsing instructions, using a regex or the like, to extract log data items from a log record based on log record template data associated with a log record template used to generate the log records. The log record template comprises a plurality of field identifiers for a log record. The examples also generate a map that, for each analyzed log record, identifies the field identifiers of the log record template and the corresponding log data items from the log record. Among other advantages, the examples eliminate a need for a human to generate log record analysis instructions for each different version of a log record, and for each different written language in which a log record is created, saving time and costs associated with log record analysis.

Figure 1:
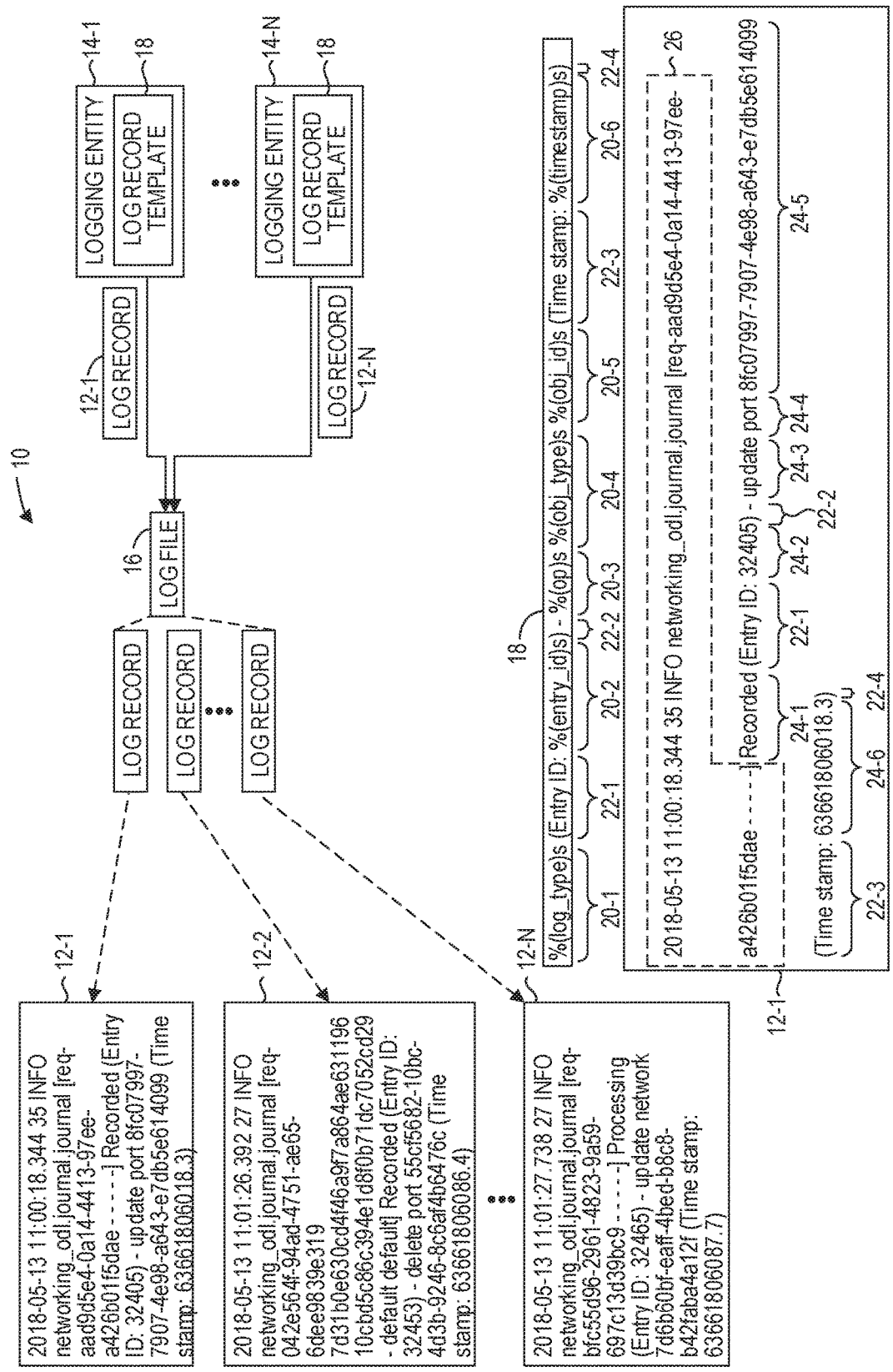
FIG. 1 is a block diagram of an environment illustrating the generation of a plurality of log records according to one example.

FIG. 1 is a block diagram of an environment 10 illustrating the generation of a plurality of log records 12-1-12-N (generally, log records 12) according to one example. The environment 10 may include a plurality of different logging entities 14-1-14-N (generally, logging entities 14), each of which may be programmed to generate a log record 12 upon the occurrence of an event, after a period of time, or in response to any other desired criteria. The log records 12 may be stored in one or more log files 16. The logging entities 14 utilize a log record template 18 to generate the log records 12. The log record template 18 includes a plurality of field identifiers 20-1-20-6. When generating a log record 12, a logging entity 14 replaces the field identifiers 20-1-20-6 with corresponding log data items. The log record template 18 may also include one or more textual strings 22-1-22-4, which are also stored in the log record 12, typically in conjunction with a particular log data item.

As an example, the log record 12-1 includes a plurality of log data items 24-1-24-6 which correspond, respectively, to the field identifiers 20-1-20-6. For example, the log data item 24-1 corresponds to the field identifier 20-1, and the log data item 24-6 corresponds to the field identifier 20-6. The log record 12-1 also includes the textual strings 22-1-22-4 from the log record template 18.

In this example the log records 12 also include logging metadata 26 which may have a separate and different format from the log record template 18, and may be a constant format irrespective of the particular log record template 18 used by a logging entity 14. The logging metadata 26 may be generated by the logging entity 14, or by another entity to which the logging entity 14 sends the information that the logging entity 14 generated from the log record template 18. While the examples discussed herein operate on the log record data other than the logging metadata 26, the examples may also be used to extract desired information from the logging metadata 26 using the same principles discussed herein.

Figure 2:
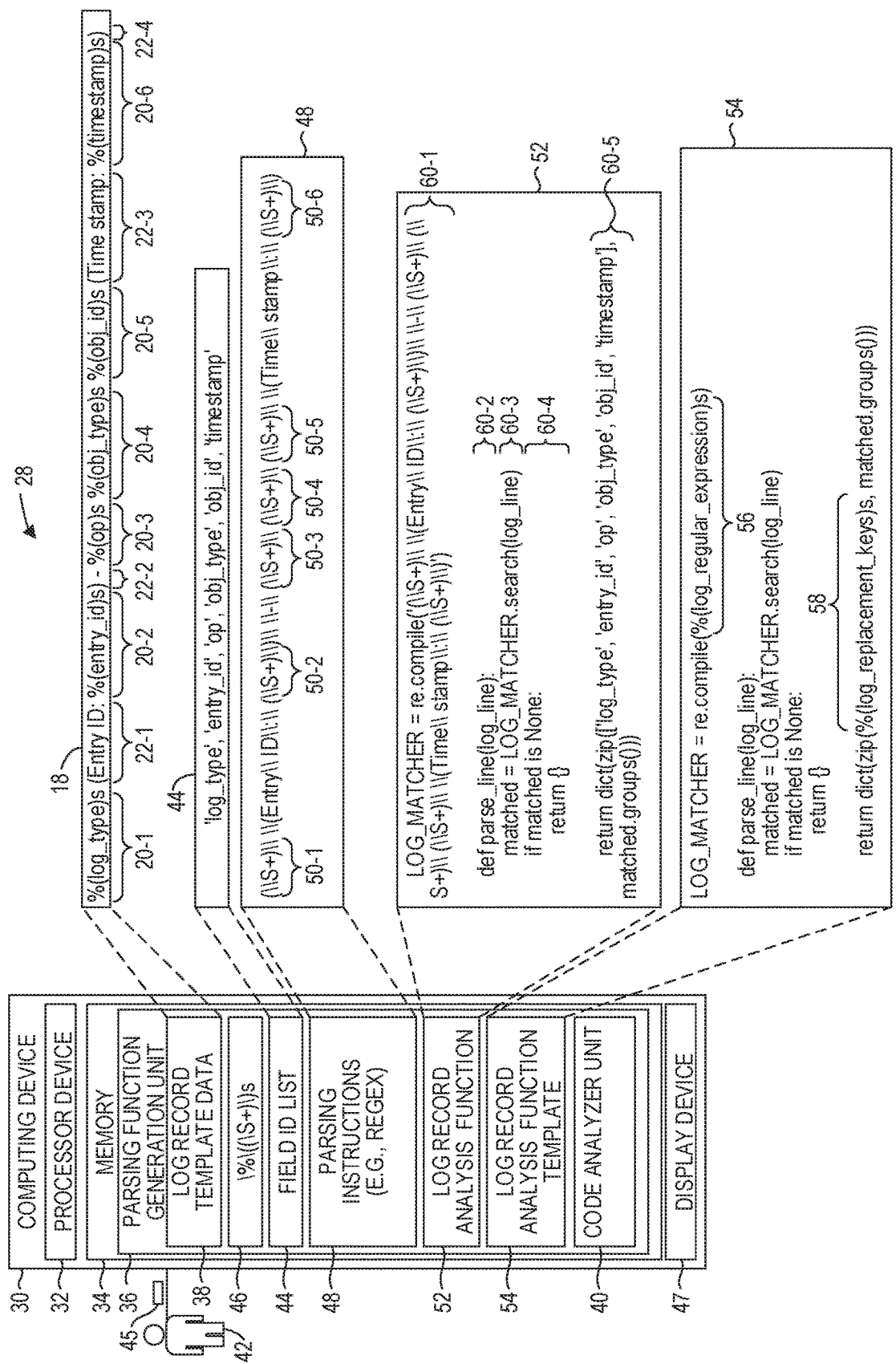
FIG. 2 is a block diagram of an environment illustrating aspects of the examples utilizing the log records illustrated in FIG. 1.

FIG. 2 is a block diagram of an environment 28 illustrating aspects of the examples utilizing the log records 12 illustrated in FIG. 1. The environment 28 includes a computing device 30, such as a Linux workstation or the like. The computing device 30 includes a processor device 32 and a memory 34. The memory 34 includes a parsing function generation unit 36, which, in this example, comprises a plurality of complex executable instructions that program the processor device 32 to implement the functionality described herein. In other examples, the parsing function generation unit 36 may be implemented in circuitry, such as an application specific integrated circuitry (ASIC), or the like. Because the parsing function generation unit 36 is a component of the computing device 30, functionality implemented by the parsing function generation unit 36 may be attributed herein to the computing device 30 generally. Moreover, in examples where the parsing function generation unit 36 comprises software instructions that program the processor device 32 to carry out functionality discussed herein, functionality implemented by the parsing function generation unit 36 may be attributed herein to the processor device 32.

For purposes of illustration and discussion, the examples will be discussed herein in the context of the log record template 18; however, the examples may utilize any log record template. The parsing function generation unit 36 receives, as input, log record template data 38 associated with the log record template 18, which comprises the plurality of field identifiers 20-1-20-6 for a log record 12. The log record template data 38 may comprise any data from which the plurality of field identifiers 20-1-20-6 may be identified. For example, the log record template data 38 may comprise the log record template 18. In another example, the log record template data 38 may comprise a plurality of instructions of a program that generates log records 12 using the log record template 18, such as the logging entity 14-1. In one example, a code analyzer unit 40 may analyze the plurality of instructions to identify the plurality of field identifiers 20-1-20-6. In one example, the instructions may comprise source code statements written in a particular programming language, such as Python, C++, or the like, and the code analyzer unit 40 analyzes the source code statements to identify those that relate to generating a log record 12, and extracts from such statements the field identifiers 20-1-20-6. One example of such source code statements is provided below:

```
def __log_entry(log_type, entry, log_level=logging.INFO, **kwargs):
    delta = datetime.now( ) - datetime.min
    timestamp = delta.total_seconds( )
    log_dict = {'log_type': log_type, 'op': entry.operation,
                'obj_type': entry.object_type, 'obj_id': entry.object_uuid,
                'entry_id': entry.seqnum, 'timestamp': timestamp}
    LOG.log(log_level, LOG_ENTRY_TEMPLATE, log_dict, **kwargs)
```

The above function may then be invoked at various locations throughout the program, such as the following example invocations:

```
_log_entry('Recorded', entry)
_log_entry('Processing', entry)
_log_entry('Completed', entry)
_log_entry('Error while processing', entry,
           log_level=logging.ERROR, exc_info=True)
```

In another example, the instructions may comprise executable code statements, and the code analyzer unit 40 analyzes the executable code statements, such as via static code analysis or the like, to identify the field identifiers 20-1-20-6.

In this example, the log record template data 38 comprises the log record template 18. In one example, the parsing function generation unit 36 may present a user interface to a user 42, and the user 42 may designate a location on a storage device of the log record template 18. The parsing function generation unit 36 analyzes the log record template 18 to identify the plurality of field identifiers 20. The parsing function generation unit 36 may generate a field identifier (ID) list 44 that contains the plurality of field identifiers 20.

In one example, the parsing function generation unit 36 uses a regular expression (regex) 46 to parse the log record template 18 to extract the plurality of field identifiers 20 from the log record template 18. The phrase "regular expression" as used herein refers to a sequence of characters that define a search pattern. In one example, the parsing function generation unit 36 receives, from the user 42, user input 45 that identifies a regular expression that defines a search pattern, and the parsing function generation unit 36 processes the log record template 18 with the regular expression to extract the plurality of field identifiers 20.

In this example, the regex 46 is based on field demarcation characters of "%(" that precedes each field identifier 20, and field demarcation characters of ")s" that precede each field identifier 20. However, in other examples, other demarcation characters may be used, and the regex 46 would then search for such other demarcation characters in the log record template 18.

In other examples, the environment 10 (FIG. 1) may utilize a number of different predetermined logging formats, and the parsing function generation unit 36 presents, on a display device 47, the plurality of different logging formats to the user 42. Each different logging format corresponds to a particular predetermined regular expression of a plurality of different regular expressions. The parsing function generation unit 36 receives user input from the user 42 that identifies a particular logging format of the plurality of logging formats, and the parsing function generation unit 36 processes the log record template 18 with the regular expression that corresponds to the particular logging format to extract the plurality of field identifiers 20.

The parsing function generation unit 36, based on the log record template data, automatically generates parsing instructions 48 configured to extract a plurality of log data items 24 from a log record 12 that was generated based on the log record template 18. Each log data item 24 corresponds to one of the plurality of field identifiers 20. In one example the parsing instructions 48 comprise a regular expression that defines a search pattern based on the field identifiers 20 in the log record template 18. The regular expression includes a plurality of capture groups 50-1-50-6 (generally, capture groups 50), each capture group 50 corresponding to one of the field identifiers 20 in the log record template 18 and configured to extract from a log record 12 a log data item 24 in the log record 12 that corresponds to the field identifier 20. If the log record template 18 includes one or more textual strings 22, the parsing instructions 48 may also match against the one or more textual strings 22 contained in a log record 12. As used herein, the phrase "capture group" refers to a regular expression group of characters that match against a defined sequence of characters and, if a match exists, extracts the defined sequence of characters into a list.

In one example, the parsing function generation unit 36 may then access, or otherwise be provided, a log record 12 that was generated based on the log record template 18 to the parsing instructions 48. The parsing function generation unit 36 provides the log record 12 to the parsing instructions 48. For example, the parsing function generation unit 36 processes the log record 12 with the parsing instructions 48 using an appropriate regex function call. If the parsing instructions 48 match the log record 12, then the parsing function generation unit 36 then outputs information, which identifies the plurality of field identifiers 20 and the plurality of log data items 24, from the log record 12. The information may also include the textual strings 22.

In another example, rather than processing log records 12, the parsing function generation unit 36, based on the log record template data 38 and the plurality of field identifiers 20, automatically generates a log record analysis function 52 that is configured to receive a log record 12 that was generated based on the log record template 18, extract a plurality of log data items 24 from the log record 12, each log data item 24 corresponding to one of the plurality of field identifiers 20, and output information that identifies the plurality of field identifiers 20 and the plurality of log data items 24 from the log record 12. The log record analysis function 52 may then be used subsequently to process any number of log records 12 as desired.

In one example, to generate the log record analysis function 52, the parsing function generation unit 36 accesses a log record analysis function template 54 that includes a regular expression field 56 and a field identifier field 58. The log record analysis function 52 replaces the regular expression field 56 with the parsing instructions 48, and replaces the field identifier field 58 with the plurality of field identifiers 20.

In one example, the log record analysis function 52 is generated in the Python programming language, and comprises instructions 60-1 that are configured to, when executed, call a regex function with the parsing instructions 48 to compile the parsing instructions 48. The log record analysis function 52 includes instructions 60-2 that are configured to receive a log record 12. The log record analysis function 52 includes instructions 60-3 that are configured to determine if the parsing instructions 48 match the log record 12. If there is no match, the instructions 60-4 return with no log data items 24 from the log record 12. The parsing instructions 48, for example, may not match a log record 12 that was generated based on a different log record template than the log record template 18. If the parsing instructions 48 match the log record 12, instructions 60-5 return the field identifiers 20 in association with the log data items 24 in the log record 12. As will be illustrated below, in one example the output comprises a key-value map wherein each key comprises a different one of the field identifiers 20 and wherein each value comprises the log data item 24 from the log record 12 that corresponds to the different one of the field identifiers 20.

Figure 3:
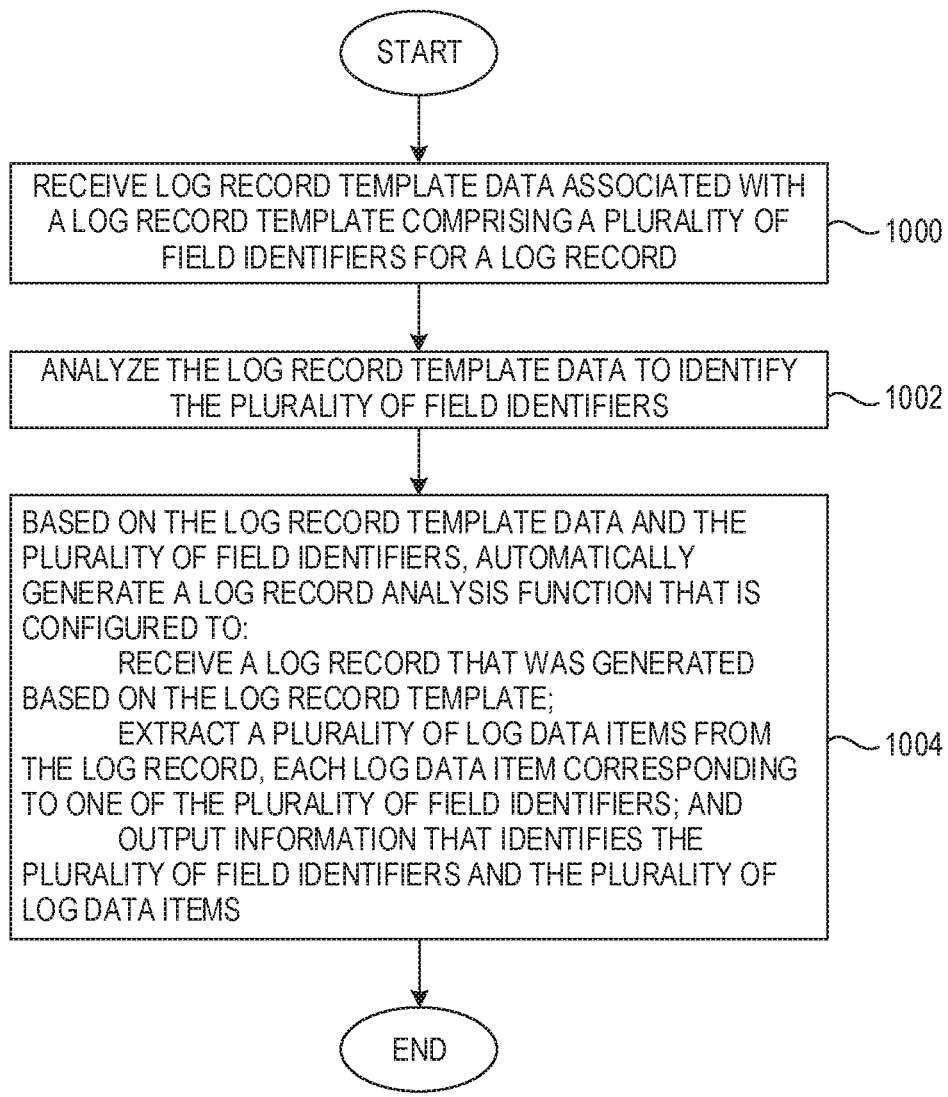
FIG. 3 is a flowchart of a method for generating a log record analysis function according to one example.

FIG. 3 is a flowchart of a method for generating the log record analysis function 52 according to one example. FIG. 3 will be discussed in conjunction with FIG. 2. The parsing function generation unit 36 receives the log record template data 38 associated with the log record template 18, which comprises the plurality of field identifiers 20 for a log record 12 (FIG. 3, block 1000). The parsing function generation unit 36 analyzes the log record template data 38 to identify the plurality of field identifiers 20 (FIG. 3, block 1002). Based on the log record template data 38 and the plurality of field identifiers 20, the parsing function generation unit 36 automatically generates the log record analysis function 52 that is configured to receive a log record 12 that was generated based on the log record template 18, extract a plurality of log data items 24 from the log record 12, each log data item 24 corresponding to one of the plurality of field identifiers 20, and output information that identifies the plurality of field identifiers 20 and the plurality of log data items 24 from the log record 12.

Figure 4:
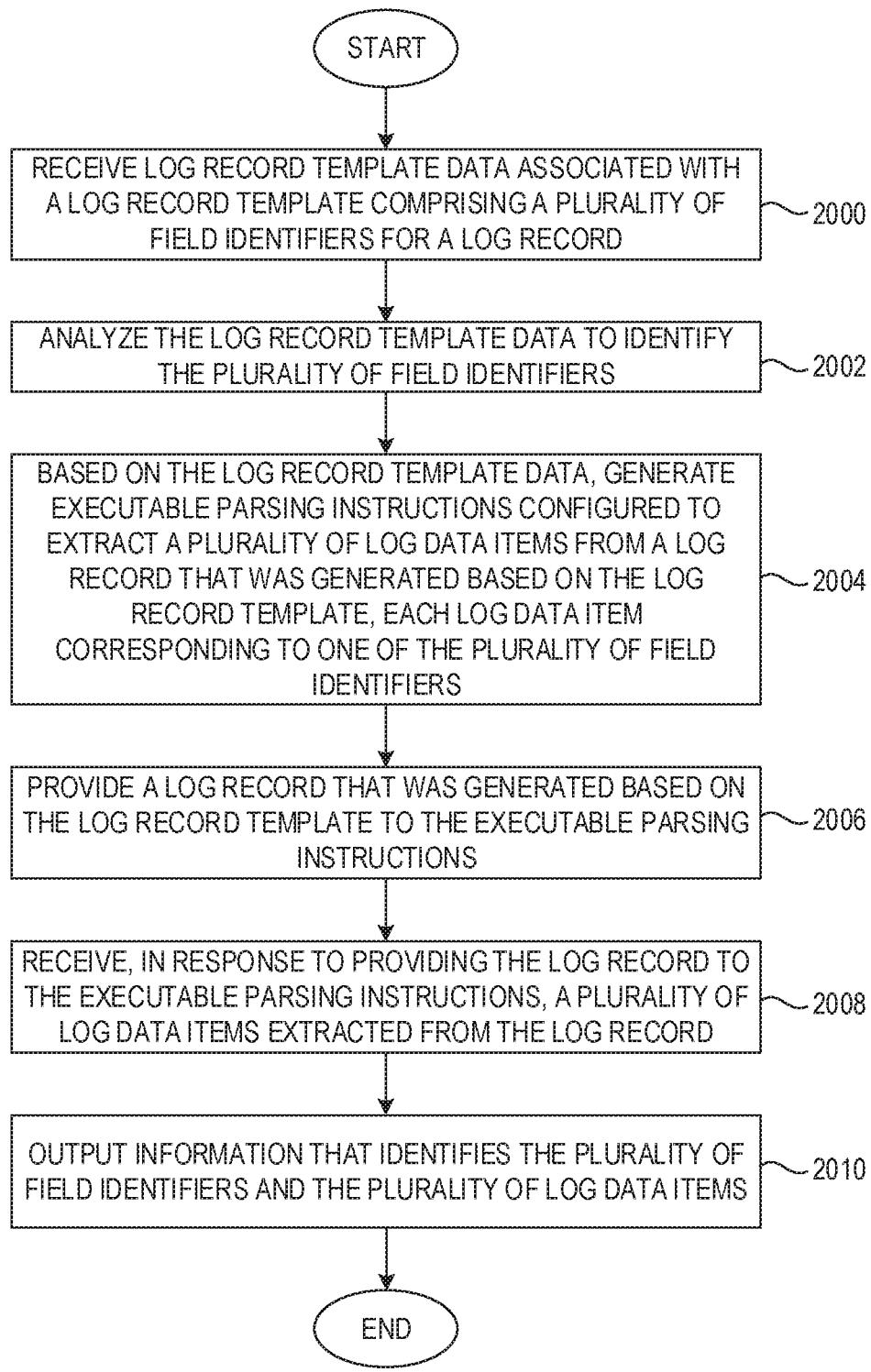
FIG. 4 is a flowchart of a method for automatically analyzing log records based on the log record template data according to one example.

FIG. 4 is a flowchart of a method for automatically analyzing log records based on the log record template data 38 according to one example. FIG. 4 will be discussed in conjunction with FIG. 2. In this example, the parsing function generation unit 36 receives the log record template data 38 associated with the log record template 18, which comprises the plurality of field identifiers 20 for a log record 12 (FIG. 4, block 2000). The parsing function generation unit 36 analyzes the log record template data 38 to identify the plurality of field identifiers (FIG. 4, block 2002). The parsing function generation unit 36, based on the log record template data 38, generates executable parsing instructions 48 configured to extract the plurality of log data items 24 from a log record 12 that was generated based on the log record template 18. Each log data item 24 corresponds to one of the plurality of field identifiers 20 (FIG. 4, block 2004). The parsing function generation unit 36 provides a log record 12 that was generated based on the log record template 18 to the executable parsing instructions 48 (FIG. 4, block 2006). The parsing function generation unit 36 receives, in response to providing the log record 12 to the executable parsing instructions 48, a plurality of log data items 24 extracted from the log record 12 (FIG. 4, block 2008). The parsing function generation unit 36 outputs information that identifies the plurality of field identifiers 20 and the plurality of log data items 24 from the log record 12 (FIG. 4, block 2010).

Figure 5:
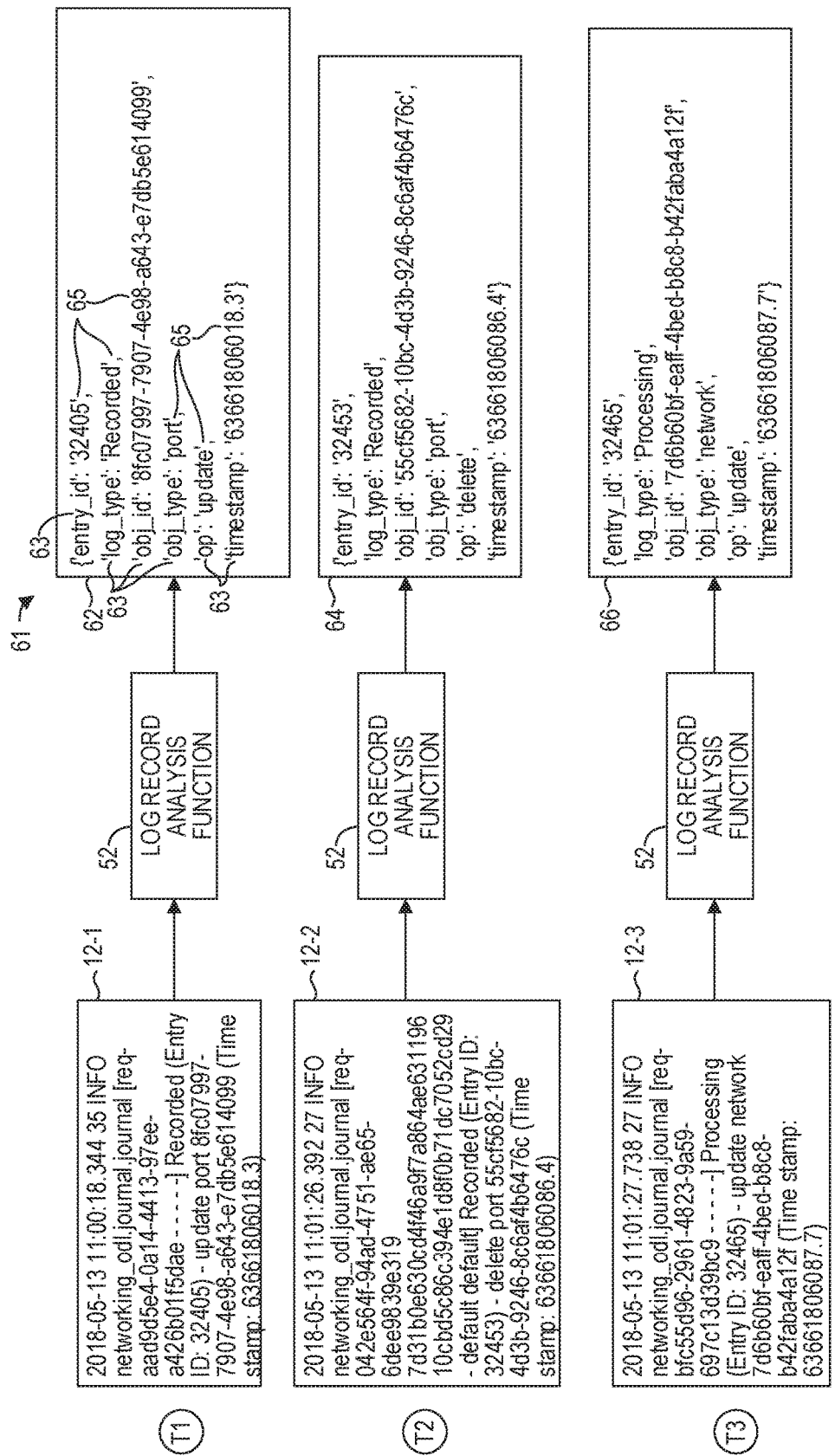
FIG. 5 is a block diagram illustrating a log record analysis function processing a plurality of log records according to one example.

FIG. 5 is a block diagram illustrating the log record analysis function 52 processing a plurality of log records 12 according to one example. The log record analysis function 52 may execute on the computing device 30, or on another computing device. At a time T1, the log record analysis function 52 receives the log record 12-1. In one example, the log record analysis function 52 may be utilized in conjunction with another function that reads log records 12 from a log file, and passes each log record 12 to the log record analysis function 52. The log record analysis function 52 extracts the plurality of log data items 24 from the log record 12-1. The log record analysis function 52 generates and outputs information 61, which in this example is a key-value map 62 wherein each key 63 comprises a different one of the field identifiers 20, and each value 65 comprises the log data item 24 from the log record 12-1 that corresponds to the different one of the field identifiers 20.

Similarly, at a time T2, the log record analysis function 52 receives the log record 12-2. The log record analysis function 52 extracts the plurality of log data items 24 from the log record 12-2. The log record analysis function 52 generates and outputs a key-value map 64 wherein each key comprises a different one of the field identifiers 20, and each value comprises the log data item 24 from the log record 12-1 that corresponds to the different one of the field identifiers 20.

Similarly, at a time T3, the log record analysis function 52 receives a log record 12-3. The log record analysis function 52 extracts the plurality of log data items 24 from the log record 12-3. The log record analysis function 52 generates and outputs a key-value map 66 wherein each key comprises a different one of the field identifiers 20, and each value comprises the log data item 24 from the log record 12-3 that corresponds to the different one of the field identifiers 20.

Figure 6:
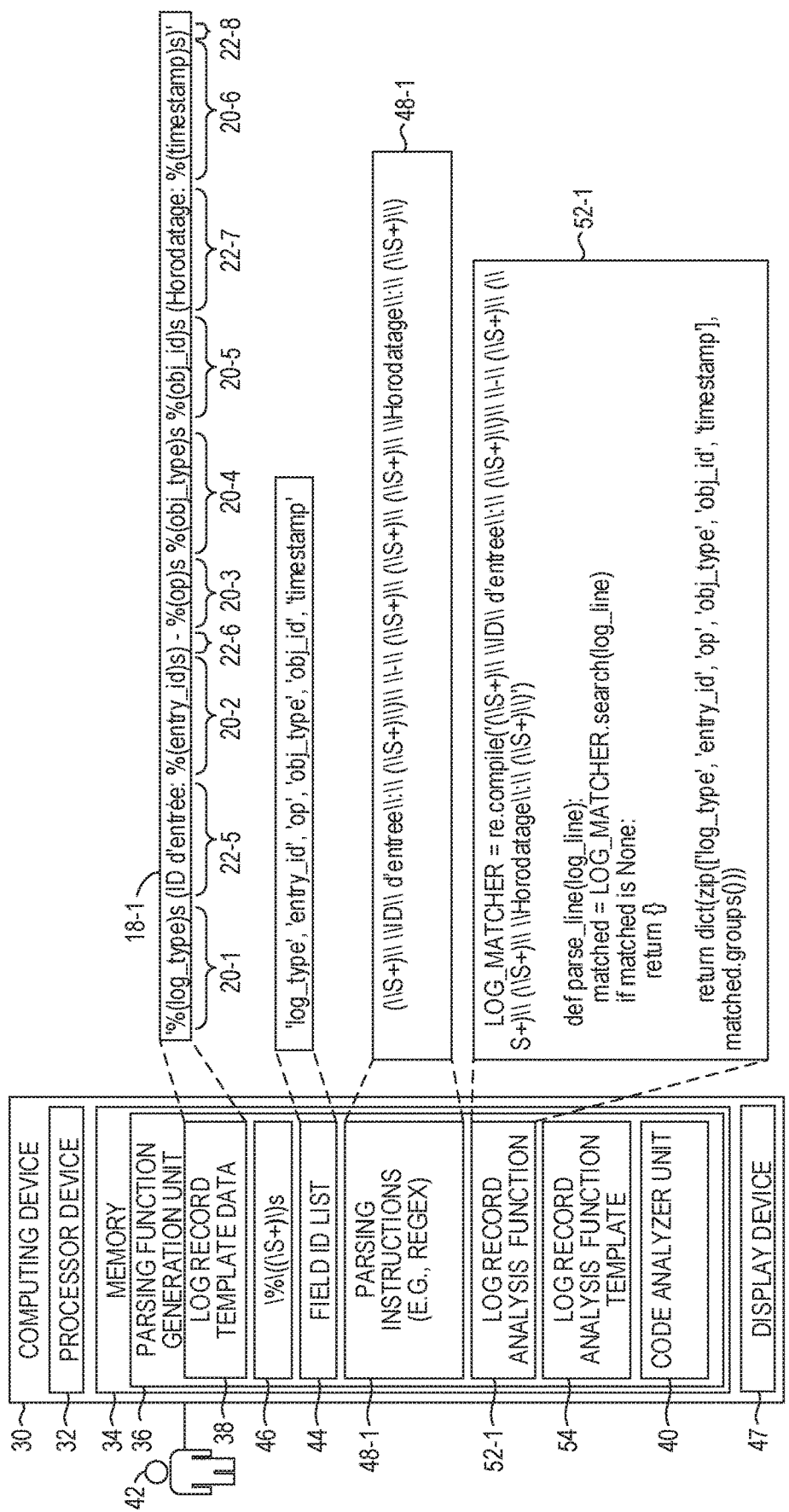
FIG. 6 is a block diagram of a computing device utilizing a log record template written in French rather than English according to one example.

In some international information technology environments, log records 12 may contain words in different written languages, such as English, French or Spanish, depending on the country in which the log record 12 is generated. In such environments, the log record template 18 may be similar or identical in each country, except for certain words, such as the textual strings 22, which are translated to the corresponding words in the particular language. FIG. 6 is a block diagram of the computing device 30 utilizing a log record template 18-1, except the textual strings 22 are written in French rather than English.

The parsing function generation unit 36 receives, as input, the log record template 18-1. The log record template 18-1 comprises the plurality of field identifiers 20-1-20-6, and textual strings 22-5-22-8. Note that the textual strings 22-5 and 22-7 are in the French language rather than English. The parsing function generation unit 36 uses the regular expression (regex) 46 to parse the log record template 18-1 to extract the plurality of field identifiers 20 from the log record template 18-1. Note that because the same field demarcation identifiers are used in both the English and French versions, the regex 46 does not differ.

The parsing function generation unit 36, based on the log record template 18-1, automatically generates parsing instructions 48-1 configured to extract a plurality of log data items 24 from a log record 12 that was generated based on the log record template 18-1. Each log data item 24 corresponds to one of the plurality of field identifiers 20. Note that the parsing instructions 48-1 are substantially similar to the parsing instructions 48, except for the use of French textual strings identified in the log record template 18-1.

The parsing function generation unit 36, based on the log record template 18-1 and the plurality of field identifiers 20, automatically generates a log record analysis function 52-1 that is configured to receive a log record 12 that was generated based on the log record template 18-1, extract a plurality of log data items 24 from the log record 12, each log data item 24 corresponding to one of the plurality of field identifiers 20, and output information that identifies the plurality of field identifiers 20 and the plurality of log data items 24 from the log record 12. The log record analysis function 52 may then be used subsequently to process any number of log records 12 as desired.

In one example, to generate the log record analysis function 52, the parsing function generation unit 36 accesses the log record analysis function template 54 that includes a regular expression field 56 and a field identifier field 58. The log record analysis function 52 replaces the regular expression field 56 with the parsing instructions 48-1, and replaces the field identifier field 58 with the plurality of field identifiers 20.

Figure 7:
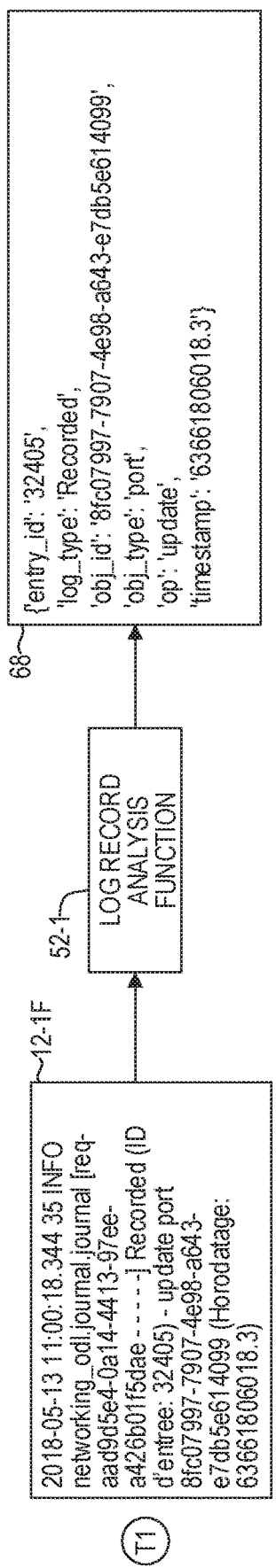
FIG. 7 is a block diagram illustrating a log record analysis function processing a log record according to another example.

FIG. 7 is a block diagram illustrating the log record analysis function 52-1 processing a log record 12-1F generated based on the log record template 18-1. At a time T1, the log record analysis function 52-1 receives the log record 12-1F. The log record analysis function 52-1 extracts the plurality of log data items 24 from the log record 12-1F. The log record analysis function 52-1 generates and outputs a key-value map 68 wherein each key comprises a different one of the field identifiers 20, and each value comprises the log data item 24 from the log record 12-1F that corresponds to the different one of the field identifiers 20.

Figure 8:
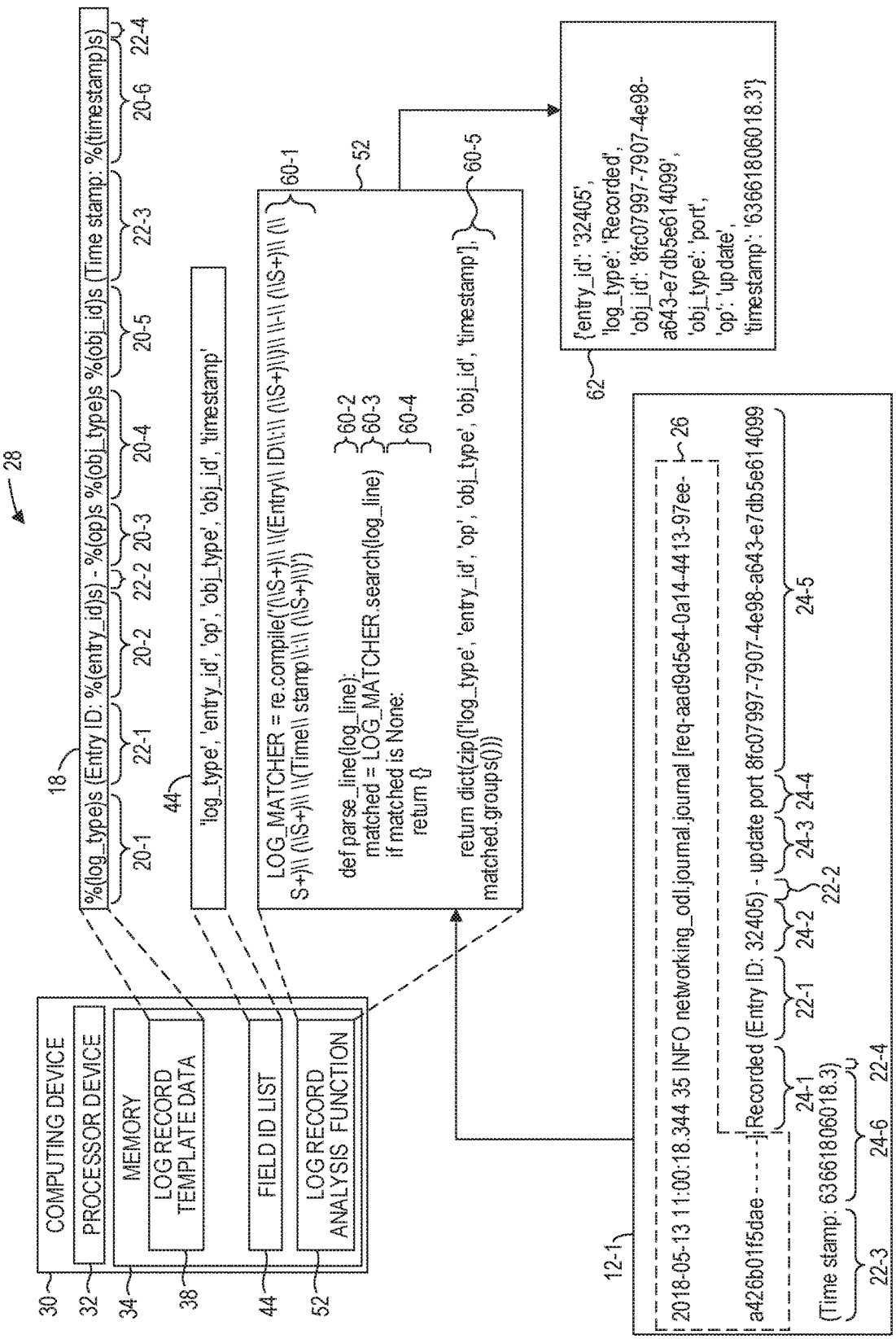
FIG. 8 is a simplified block diagram of the computing device illustrated in FIG. 2 according to one example.

FIG. 8 is a simplified block diagram of the computing device 30 illustrated in FIG. 2 according to one example. The computing device 30 includes the memory 34 and the processor device 32 that is coupled to the memory 34. The processor device 32 receives the log record template data 38 associated with the log record template 18 comprising a plurality of field identifiers 20 for a log record 12. The processor device 32 analyzes the log record template data 38 to identify the plurality of field identifiers 20. Based on the log record template data 38 and the plurality of field identifiers 20, the processor device 32 automatically generates the log record analysis function 52 that is configured to receive the log record 12-1 that was generated based on the log record template 18, extract a plurality of log data items 24 from the log record 12-1, each log data item 24 corresponding to one of the plurality of field identifiers 20, and output information, such as the key-value map 62, that identifies the plurality of field identifiers 20 and the plurality of log data items 24 from the log record.

Figure 9:
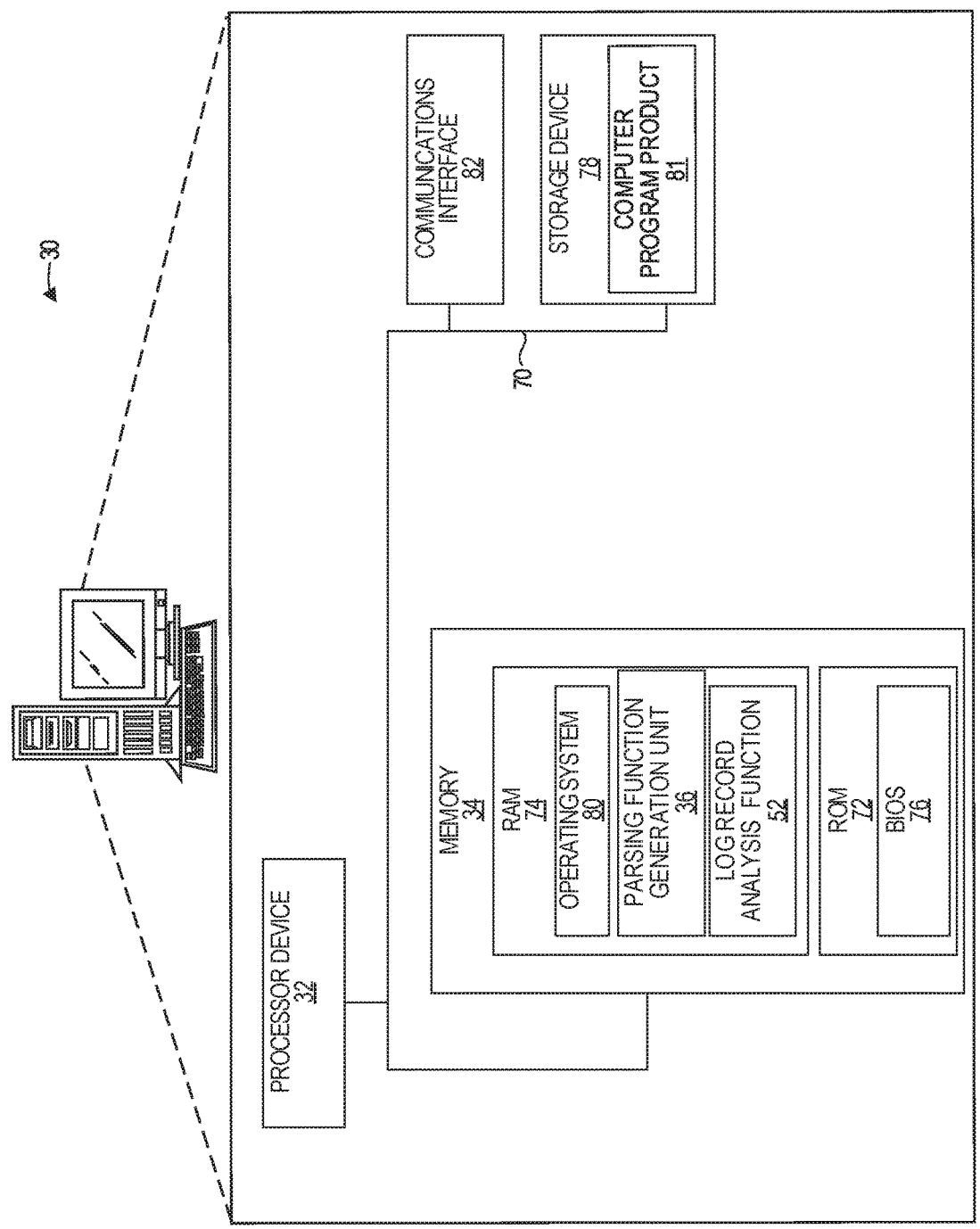
FIG. 9 is a block diagram of the computing device 30 suitable for implementing examples according to one example.

FIG. 9 is a block diagram of the computing device 30 suitable for implementing examples according to one example. The computing device 30 may comprise any computing or electronic device capable of including firmware, hardware, and/or executing software instructions to implement the functionality described herein, such as a computer server, a desktop computing device, a laptop computing device, or the like. The computing device 30 includes the processor device 32, the memory 34, and a system bus 70. The system bus 70 provides an interface for system components including, but not limited to, the memory 34 and the processor device 32. The processor device 32 can be any commercially available or proprietary processor.

The system bus 70 may be any of several types of bus structures that may further interconnect to a memory bus (with or without a memory controller), a peripheral bus, and/or a local bus using any of a variety of commercially available bus architectures. The memory 34 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the computing device 30. The volatile memory 74 may also include a high-speed RAM, such as static RAM, for caching data.

The computing device 30 may further include or be coupled to a non-transitory computer-readable storage medium such as a storage device 78, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 78 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 78 and in the volatile memory 74, including an operating system 80 and one or more program units, such as the parsing function generation unit 36 and the log record analysis function 52, which may implement the functionality described herein in whole or in part.

All or a portion of the examples may be implemented as a computer program product 81 stored on a transitory or non-transitory computer-usable or computer-readable storage medium, such as the storage device 78, which includes complex programming instructions, such as complex computer-readable program code, to cause the processor device 32 to carry out the steps described herein. Thus, the computer-readable program code can comprise software instructions for implementing the functionality of the examples described herein when executed on the processor device 32. The processor device 32, in conjunction with the parsing function generation unit 36 in the volatile memory 74, may serve as a controller, or control system, for the computing device 30 that is to implement the functionality described herein. The computing device 30 may also include a communications interface 82 suitable for communicating with a network as appropriate or desired. It is noted that the parsing function generation unit 36 constitutes an improvement to the computer functionality of the computing device 30 itself, since a conventional computing device 30 cannot implement the recited functionality of the parsing function generation unit 36.

Individuals will recognize improvements and modifications to the preferred examples of the disclosure. All such improvements and modifications are considered within the scope of the concepts disclosed herein and the claims that follow.

What is claimed is:

1. A method comprising:
    receiving, by a computing device comprising a processor device, log record template data associated with a log record template, the log record template data comprising a plurality of field identifiers for a log record, the plurality of field identifiers identifying corresponding fields of data in a log record generated using the log record template;
    analyzing, by the computing device, the log record template data to identify the plurality of field identifiers; and
    based on the log record template data and the plurality of field identifiers, automatically generating, by the computing device, a log record analysis function comprising code, wherein the log record analysis function is configured to:
        receive a log record that was generated based on the log record template;
        extract a plurality of log data items from the log record, each log data item corresponding to one of the plurality of field identifiers; and
        output information that identifies the plurality of field identifiers and the plurality of log data items.

2. The method of claim 1 wherein analyzing the log record template data to identify the plurality of field identifiers further comprises:
    receiving user input that identifies a regular expression that defines a search pattern; and processing the log record template with the regular expression to extract the plurality of field identifiers.

3. The method of claim 1 wherein analyzing the log record template data to identify the plurality of field identifiers further comprises:
presenting, on a display device, a plurality of logging formats, each logging format corresponding to a regular expression of a plurality of different regular expressions;
receiving user input that identifies a particular logging format of the plurality of logging formats; and
processing the log record template with the regular expression that corresponds to the particular logging format to extract the plurality of field identifiers.

4. The method of claim 1 wherein generating the log record analysis function further comprises:
automatically generating a regular expression that defines a search pattern based on the plurality of field identifiers in the log record template, wherein the regular expression includes a plurality of capture groups, each capture group of the plurality of capture groups corresponding to one of the plurality of field identifiers in the log record template and configured to extract from a log record a log data item in the log record that corresponds to the one of the plurality of field identifiers.

5. The method of claim 4 wherein the log record template further comprises at least one textual string that is not a field identifier, and wherein automatically generating the regular expression that defines the search pattern further comprises:
automatically generating the regular expression that defines the search pattern based on the plurality of field identifiers in the log record template, wherein the regular expression includes the plurality of capture groups, each capture group of the plurality of capture groups corresponding to one of the plurality of field identifiers in the log record template and configured to extract from a log record a log data item in the log record that corresponds to the one of the plurality of field identifiers, and the regular expression includes the at least one textual string configured to match against an identical at least one textual string in the log record.

6. The method of claim 4 wherein automatically generating the log record analysis function comprises:
accessing a log record analysis function template comprising a regular expression field and a field identifier field;
replacing the regular expression field with the regular expression; and
replacing the field identifier field with the plurality of field identifiers from the log record template data.

7. The method of claim 1 wherein to output the information that identifies the plurality of field identifiers and the plurality of log data items, the log record analysis function is further configured to:
generate a key-value map wherein each key comprises a different one of the plurality of field identifiers and each value comprises the log data item from the log record that corresponds to the different one of the plurality of field identifiers.

8. The method of claim 1 wherein the log record template data comprises a plurality of instructions of a program that generates log records using the log record template, and wherein analyzing the log record template data to identify the plurality of field identifiers further comprises analyzing the plurality of instructions to identify the plurality of field identifiers.

9. A computing device, comprising:
a memory; and
a processor device coupled to the memory to:
receive log record template data associated with a log record template comprising a plurality of field identifiers for a log record;
analyze the log record template data to identify the plurality of field identifiers; and
based on the log record template data and the plurality of field identifiers, automatically generate a log record analysis function comprising code, wherein the log record analysis function is configured to:
receive a log record that was generated based on the log record template;
extract a plurality of log data items from the log record, each log data item corresponding to one of the plurality of field identifiers; and
output information that identifies the plurality of field identifiers and the plurality of log data items; and
wherein to automatically generate the log record analysis function, the processor device is further to:
access a log record analysis function template comprising a regular expression field and a field identifier field;
replace the regular expression field with a regular expression that defines a search pattern based on the plurality of field identifiers in the log record template; and
replace the field identifier field with the plurality of field identifiers from the log record template data.

10. The computing device of claim 9 wherein to analyze the log record template data to identify the plurality of field identifiers, the processor device is further to:
present, on a display device, a plurality of logging formats, each logging format corresponding to a regular expression of a plurality of different regular expressions;
receive user input that identifies a particular logging format of the plurality of logging formats; and
process the log record template with the regular expression that corresponds to the particular logging format to extract the plurality of field identifiers.

11. The computing device of claim 9 wherein the regular expression includes a plurality of capture groups, each capture group of the plurality of capture groups corresponding to one of the plurality of field identifiers in the log record template and configured to extract from a log record a log data item in the log record that corresponds to the one of the plurality of field identifiers.

12. The computing device of claim 9 wherein to output the information that identifies the plurality of field identifiers and the plurality of log data items, the log record analysis function is further configured to:
generate a key-value map wherein each key comprises a different one of the plurality of field identifiers and each value comprises the log data item from the log record that corresponds to the different one of the plurality of field identifiers.

13. The computing device of claim 9 wherein the log record template data comprises a plurality of instructions of a program that generates log records using the log record template, and wherein to analyze the log record template data to identify the plurality of field identifiers, the processor device is further to analyze the plurality of instructions to identify the plurality of field identifiers.

14. A computer program product stored on a non-transitory computer-readable storage medium and including instructions configured to cause a processor device to:
- receive log record template data associated with a log record template comprising a plurality of field identifiers for a log record;
- analyze the log record template data to identify the plurality of field identifiers;
- based on the log record template data and the plurality of field identifiers, automatically generate a regular expression that defines a search pattern based on the plurality of field identifiers in the log record template, wherein the regular expression includes a plurality of capture groups, each capture group of the plurality of capture groups corresponding to one of the plurality of field identifiers in the log record template and configured to extract from a log record a log data item in the log record that corresponds to the one of the plurality of field identifiers; and
- based on the log record template data and the plurality of field identifiers, automatically generate a log record analysis function comprising code, wherein the log record analysis function is configured to:
  - receive a log record that was generated based on the log record template;
  - utilize the regular expression to extract a plurality of log data items from the log record, each log data item corresponding to one of the plurality of field identifiers; and
  - output information that identifies the plurality of field identifiers and the plurality of log data items.

15. The computer program product of claim 14 wherein to analyze the log record template data to identify the plurality of field identifiers, the processor device is further to:
- present, on a display device, a plurality of logging formats, each logging format corresponding to a regular expression of a plurality of different regular expressions;
- receive user input that identifies a particular logging format of the plurality of logging formats; and
- process the log record template with the regular expression that corresponds to the particular logging format to extract the plurality of field identifiers.

16. The computer program product of claim 14 wherein to automatically generate the log record analysis function, the processor device is further to:
- access a log record analysis function template comprising a regular expression field and a field identifier field;
- replace the regular expression field with the regular expression; and
- replace the field identifier field with the plurality of field identifiers from the log record template data.

17. The computer program product of claim 14 wherein to output the information that identifies the plurality of field identifiers and the plurality of log data items, the log record analysis function is further configured to:
- generate a key-value map wherein each key comprises a different one of the plurality of field identifiers and each value comprises the log data item from the log record that corresponds to the different one of the plurality of field identifiers.

18. The computer program product of claim 14 wherein the log record template data comprises a plurality of instructions of a program that generates log records using the log record template, and wherein to analyze the log record template data to identify the plurality of field identifiers, the processor device is further to analyze the plurality of instructions to identify the plurality of field identifiers.

\* \* \* \* \*